March 31, 1942.    G. R. MEYERCORD    2,278,331
EDGE SEAL FOR METAL FACED-PANELS
Filed Dec. 12, 1940
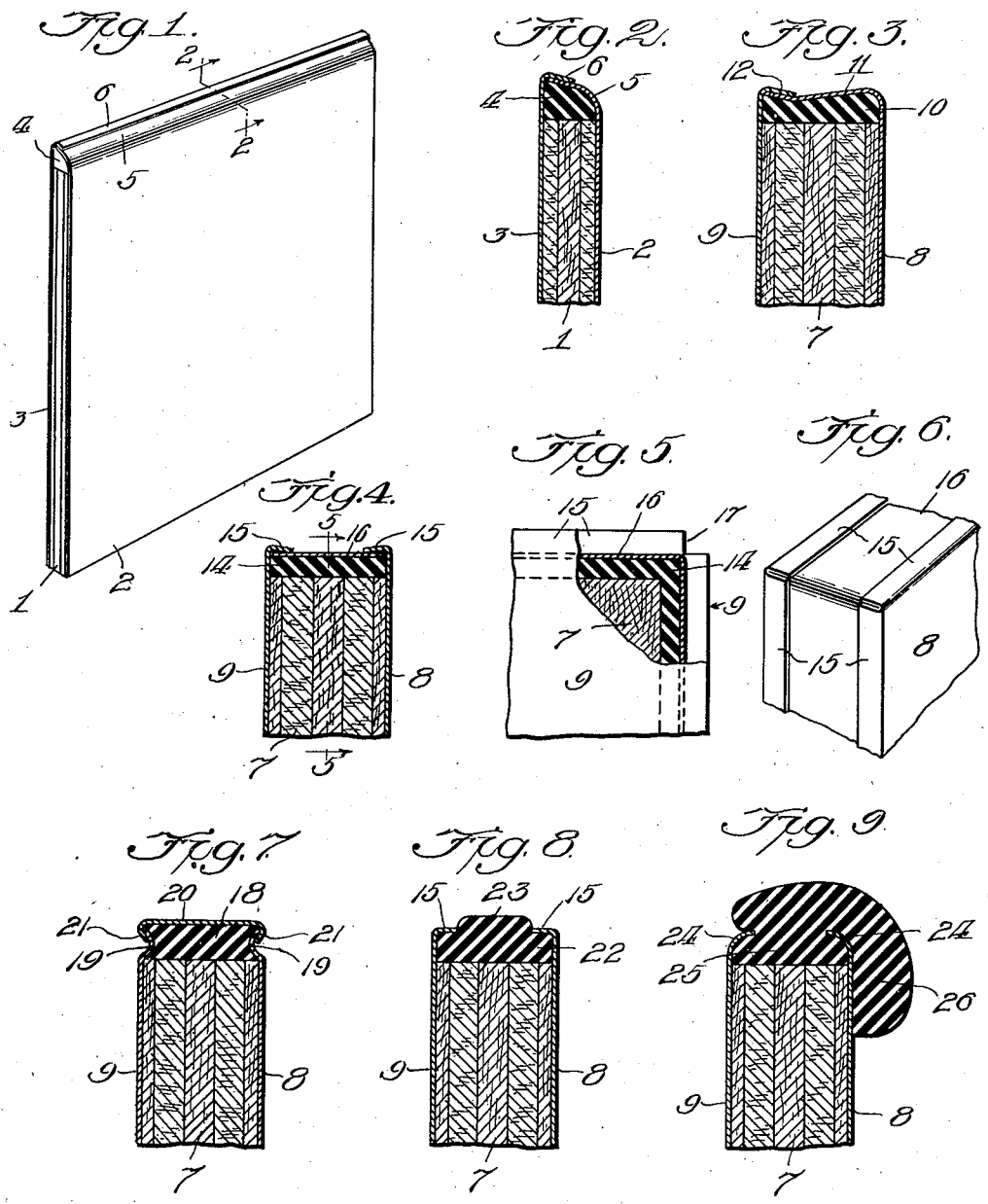
Inventor:
George R. Meyercord,
by Wm. F. Freudenreich,
Atty.

Patented Mar. 31, 1942

2,278,331

UNITED STATES PATENT OFFICE 2,278,331

EDGE SEAL FOR METAL-FACED PANELS

George R. Meyercord, Chicago, Ill., assignor to Haskelite Manufacturing Corporation, a corporation of New York Application December 12, 1940, Serial No. 369,737

4 Claims. (Cl. 20—91)

A common form of construction material comprises a plywood core having metal facings bonded thereto. For many purposes, panels of this kind have their facings simply co-extensive with the core plies, so that all of the layers of the panel are visible in the edge faces of the latter. It often happens, however, that an edge of such a panel is exposed to weather in its final position of use and, therefore, it is desirable that the exposed edge be sealed. It is also frequently desirable, or even necessary, to seal one or more edges of such a panel even though it is not to be exposed to the weather. The edge faces of the core member of a metal faced panel can be covered by simply extending the metal beyond the core and flanging it over. This, however, does not produce a seal. Where an effective seal has been required, the usual practice has been to solder overlapping or meeting flange-like elements bent or folded laterally from the facings across the edge face or faces of the core member. Not all metals lend themselves to soldering. For example, it is very difficult to solder aluminum. Therefore, the practice heretofore has been to leave the edges of such panels unsealed, regardless of the uses to which they are to be put. Even where a soldering job can be well done, the cost is great because the only feasible method of which I know has been carefully to solder each joint by hand.

The object of the present invention is to provide a simple and novel means for effectively sealing one or more edges of a metal-faced panel, without the use of solder or other means seeking to effect a tight joint between meeting metal surfaces, thereby not only eliminating the costly soldering operation, but making it possible to secure a sealed edge without regard to the kind of metal employed for facings.

In carrying out my invention, I cover the edge face or faces of the core to be sealed with soft rubber and utilize parts anchored to the facings to clamp the rubber tightly against the core. The simplest way of doing this is to extend the facings beyond the core so as to form with an edge to be sealed a channel, placing a strip of rubber in this channel, and then folding portions of the protruding margins of the facings over the rubber or into gripping relation thereto. The strip of rubber may be stretched somewhat before applying the permanent clamping means, thereby placing the rubber under an initial stress that insures good contact with the edge face of the core and also with the inner surfaces of the projecting marginal portions of the facings. The invention may, however, take a great variety of forms.

The various features of novelty whereby my invention is characterized will hereinafter be pointed out with particularity in the claims; but, for a full understanding of my invention and of its objects and advantages, reference may be had to the following detailed description taken in connection with the accompanying drawing, wherein:

Figure 1 is a perspective view of a metal-faced panel one edge of which is sealed in accordance with the present invention; Fig. 2 is a section, on a larger scale than Fig. 1, taken on line 2—2 of Fig. 1, showing only a small fragment of the panel; Fig. 3 is a view similar to Fig. 2, showing a somewhat thicker panel and a slightly modified form of edge seal; Fig. 4 is a view similar to Fig. 3, illustrating a modification in which the anchoring means includes a separate metal strip overlying the rubber; Fig. 5 is a plan view of one corner of the panel shown in Fig. 4, illustrating the assembly before the metal facings are flanged over, and a fragment of the facing toward the observer being broken away; Fig. 6 is a perspective view of a corner of the panel shown in Fig. 4; Fig. 7 is a view similar to Fig. 4 showing another arrangement in which a separate metal strip is employed; Fig. 8 is a view similar to Figs. 4 and 7, illustrating still another modification, in which a portion of the rubber is exposed along the edge of the panel; and Fig. 9 is a view similar to Fig. 8, showing a modification somewhat like that in Fig. 8, but providing an additional amount of exposed rubber adapted to serve as a cushion on one face of the panel.

Referring to Figs. 1 and 2, I represents a plywood core provided with faces 2 and 3 of sheet metal bonded thereto. There is nothing novel in the construction of the panel itself which is shown as comprising simply a three-ply core of wood and thin metal facings. It will be seen that the metal facings are extended a substantial distance beyond the edge of the panel to be sealed, thereby providing a channel extending throughout the entire length of that edge. Fitted into this channel is a strip 4 of soft rubber whose thickness is less than the width of the projecting portions of the facings, that is, the depth of the channel. The extreme marginal portion of the facing 2 is turned in so as to overlie and conform to the contour of the rubber strip across the entire length and width of the latter, as indicated at 5. Likewise, a flange 6 from the facing 3 is bent or turned so as to rest upon and overlap the part 5. If the work is properly done, the rubber in the completed article is held under sufficient stress to insure that it bears tightly against the edge face of the core member of the panel and against the protruding parts of the facings, especially in the vicinity of the edge face of the core member. Thus, the rubber strip forms an effective seal that prevents the entrance of water to the core through the protected edge. No soldering of the overlapping metal parts is required, so that the cost of sealing the edge is not much greater than the cost of simply protecting the edge mechanically by turning over the marginal portions of the facings, as has heretofore been commonly done.

In Figure 3 there is shown a slightly different form of seal. The core 7 is shown as comprising five plies. The facings 8 and 9 are extended beyond an edge of the core to provide a channel for a fairly thin, almost flat, rubber strip 10. A wide flange 11 is turned inwardly across and in engagement with the strip from the facing 8, whereas the flange 12 on the facing 9 is substantially the same as the flange 6 in Figs. 1 and 2.

In Fig. 4 the panel is the same as that in Fig. 3. However, the facings do not project as far beyond the core as they do in Fig. 3; the channel being only deep enough to receive a thin, flat rubber strip 14, rectangular in cross section and to provide narrow inturned flanges 15. Overlying the rubber strip, however, is a thin hat strip 16 of metal. Thus, the separate metal strip, together with the narrow flanges 5 that press the metal strip down on top of the rubber, form the clamping or anchoring means. This particular construction makes it easy to carry the seal around the corners of the panel, as shown in Figs. 5 and 6. Thus, as appears in Fig. 5, the facings simply have little notches 17 cut into the corners thereof, either before or after the facings have been applied to the core. Then, with the panel in the condition illustrated in Fig. 5, the rubber strip is laid into the channel and carried past one or all of the corners, after which the metal-protecting strip 16 is placed over the rubber. The flanges 15 are then turned over so as to produce the completed product appearing in Fig. 6.

In Fig. 7 the rubber strip 18 is somewhat thicker than the depth of the channel bounded by an edge face of the core and the protruding marginal portions of the facings, and these marginal portions are deformed by bending them inwardly and then outwardly to produce little trough-shaped elements 19. The metal strip 20, corresponding to the strip 16 in Figs. 4 to 6, is then laid upon the rubber. In this case the metal strip has downwardly and inwardly-directed narrow flanges 21, which snap down over the protruding facings and into the valleys of the troughs 19.

In Fig. 8 the panel with its flanged protruding facings is very similar to that in Fig. 4. However, instead of employing a metal strip overlying the rubber, the rubber strip 22 is made thicker than the strip 14, so that the flanges 15 on the facings rest directly upon the same. Furthermore, a portion 23 of considerable width extending throughout the length of the strip projects outwardly through the space between the longitudinal edges of the flanges 15.

The construction shown in Fig. 9 is much like that of Fig. 8, excepting that the flanges 24 on the facings are bent or turned inwardly so as to form longitudinal sections of a cylindrical seal, while the rubber strip comprises an inner part 25 that is gripped by the flanges 24 and clamped tightly against the edge face of the core, while the protruding portion of the rubber strip is widened in both directions outwardly from the flanges 24, and is continued laterally and then inwardly over one face of the panel for a considerable distance, in the form of a thick, wide lip 26. This particular construction is well adapted for panels which must have on one face a gasket to seal the joint between the same and another surface against which the panel is pressed. An instance of such a use is a refrigerator door. However, the sealing and cushioning means need not extend entirely around the panel. For example, the sealing and cushioning means may be applied to the edge of a door opposite the hinge edge in order to seal that edge and at the same time provide a buffer or cushion that will reduce the shock and noise of the door in closing.

It will be seen that in all forms of invention illustrated, an effective edge seal is obtained by the simple method of squeezing a strip of rubber into a valley or channel and anchoring it there by means including elements of the panel facings. Consequently, except for the inclusion of the rubber, the process varies but little from that if simply flanging over the marginal portions of the facings to cover the edges of the cores as has heretofore been commonly done. The cost of the rubber and of the labor involved in laying it in the edge channel of a panel is very small compared to the cost of making soldered joints, and there is much greater certainty of securing a successful seal by means of the present invention than under the old soldering method. Furthermore, as heretofore pointed out, edges of panels faced with certain kinds of metal have been left unsealed, even where a seal was highly desirable, simply because of the great difficulty in effecting a seal by prior methods; whereas the present invention makes it just as easy to seal one or more edges of a panel faced with one metal as with another. In addition, the sealing strip may be fastened to serve as a bumper or cushion or as a gasket between the panel with which it is associated and a wall or surface with which the panel may be engaged.

While I have illustrated and described with particularity only the single preferred form of my invention, with a few modifications, I do not desire to be limited to the exact structural details thus illustrated and described; but intend to cover all forms and arrangements which come within the definitions of my invention constituting the appended claims.

I claim:

1. A panel comprising a core member and sheet metal facing members bonded thereto, the facing members projecting beyond an edge of the core member and forming a channel therewith, a strip of soft rubber fitted in said channel, a strip of metal overlying and covering said rubber strip, and marginal portions of said facings and said metal strip being interlocked and causing the latter to clamp the rubber against said core.

2. A panel comprising a core member and sheet metal facing members bonded thereto, the facing members projecting beyond an edge of the core member and forming a channel therewith, a strip of soft rubber fitted in said channel, a strip of metal overlying said rubber strip, and portions of said facings being bent inwardly over the metal strip and causing the latter to clamp the rubber against the core.

3. A panel comprising a core member and sheet metal facing members bonded thereto, the facing members projecting beyond an edge of the core member and forming a channel therewith, a sealing strip of soft rubber fitted in said channel, and portions of said facings being bent inwardly over the strip in overlapping relation to each other and pressing the rubber against the core.

4. A panel comprising a core member and sheet metal facing members bonded thereto, an edge-sealing strip of soft rubber covering an edge of the core member, and metallic members, including elements anchored to the facings, extending over and covering said strip from facing member to facing member to hold the strip firmly against the core and conceal the same.

GEORGE R. MEYERCORD.